Sept. 28, 1954 H. T. BURDICK Re. 23,878
ELASTIC LOCKING INSERT SECURED BY THREAD ROLLING
Original Filed July 2, 1952
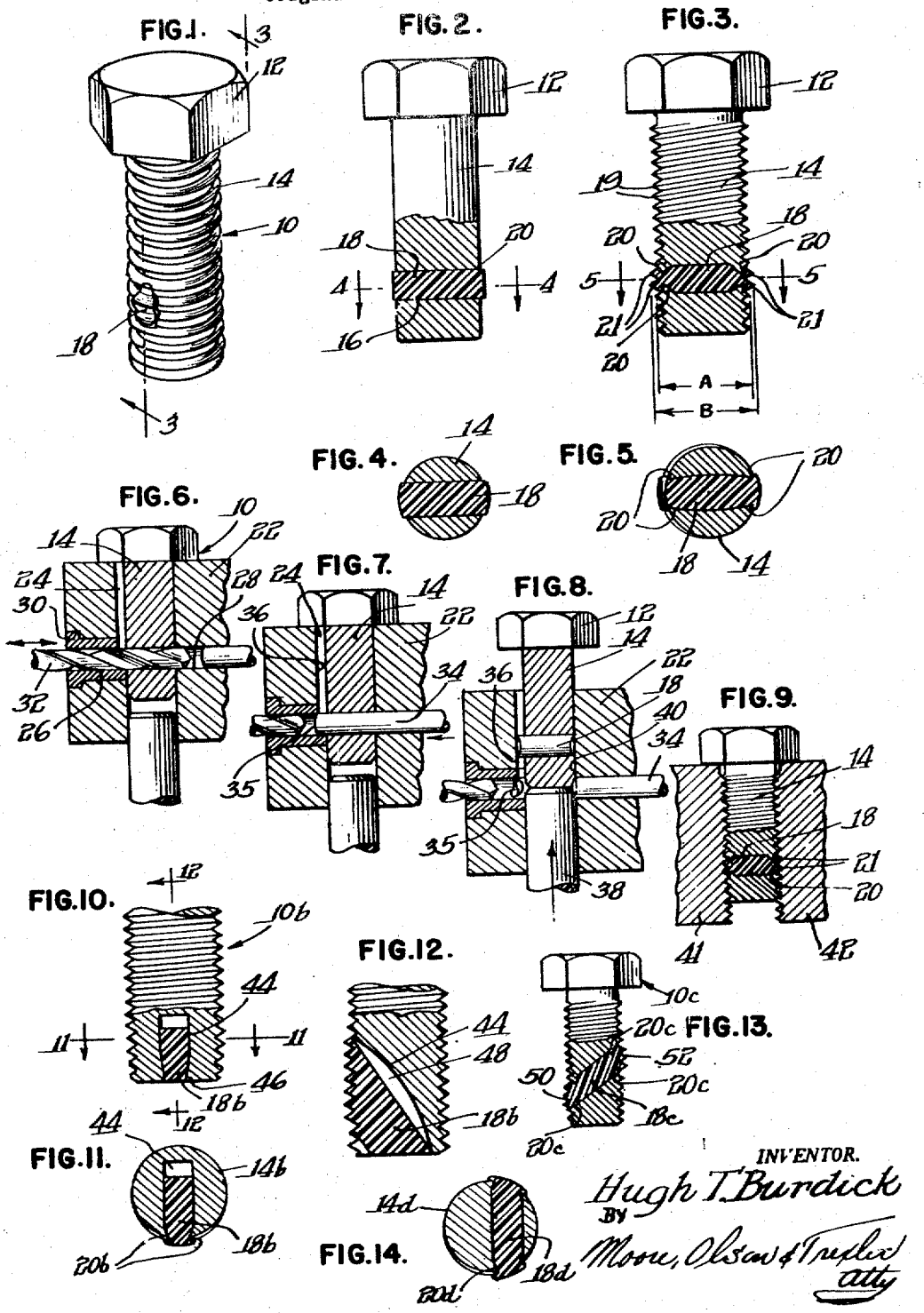
INVENTOR.
Hugh T. Burdick
BY
Moore, Olson & Taylor
Atty Reissued Sept. 28, 1954 Re. 23,878

UNITED STATES PATENT OFFICE 23,878

ELASTIC LOCKING INSERT SECURED BY THREAD ROLLING

Hugh T. Burdick, Chicago, Ill., assignor to Illinois Tool Works, Chicago, Ill., a corporation of Illinois Original No. 2,663,344, dated December 22, 1953, Serial No. 296,785, July 2, 1952. Application for reissue July 9, 1954, Serial No. 442,220

7 Claims. (Cl. 151—7)

Matter enclosed in heavy brackets [ ] appears in the original patent but forms no part of this reissue specification; matter printed in italics indicates the additions made by reissue.

The present invention relates to self-locking rotary fasteners, such as bolts, screws, studs, and the like, and more specifically relates to the improvement of a locking bolt, screw, or stud which has an insert which effectively locks such devices relative to a complementary threaded nut or equivalent against inadvertent loosening.

A study of locking screws now presently being commercialized, as well as various devices of this type which have been patented previously, indicates that a good many of these devices contemplate an article which, from the standpoint of manufacturing, is difficult or impracticable. My study also indicates that many of these devices are also of such a nature that the shank of the fastener is materially weakened in order to provide the locking element with its desirable features.

Therefore, it is a primary object of this invention to provide a locking screw which can be manufactured by well known methods and economically produced.

It is still another object of the invention to provide a locking screw having a shank portion provided with one or more locking surfaces which form continuations of the adjacent surfaces on the threaded convolutions thereof with the material of the bolt immediately surrounding said surface serving as a shoulder to retain the locking surface properly positioned.

It is still another object of this invention to provide a locking screw of the above type wherein the shoulder which retains the locking insert properly positioned is formed during the thread rolling operation so that the permanent assembly of the locking insert in the shank of the fastener is accomplished without the necessity of a secondary staking operation.

It is still another object of the invention to provide a locking screw which, by reason of proper selection of material used to form the locking insert, retains its effectiveness after long continued or repeated use.

It is still another object of the invention to provide a method for producing the fastener contemplated by this invention which assures economy in the manufacture of the device which is accomplished without the use of a special machine.

Various other objects and advantages will become apparent by reference to the following description and accompanying drawings wherein:

Fig. 1 is a perspective view of a locking screw incorporating the invention contemplated herein;

Fig. 2 is a side elevational view, partly in section, of a screw blank with the locking insert mounted therein;

Fig. 3 is a side elevational view, partly in section, taken along the line 3—3 in Fig. 1;

Fig. 4 is a cross sectional view taken along the line 4—4 in Fig. 2;

Fig. 5 is a cross sectional view taken along the line 5—5 in Fig. 3;

Fig. 6 is a cross sectional view showing the first step in the manufacture of a locking bolt of the type contemplated by the invention herein, wherein a recess is provided in the shank of the screw;

Fig. 7 is a cross sectional view of a screw blank and shows one method of feeding a plastic insert through the aperture provided for accommodating same;

Fig. 8 is a cross sectional view of a fastener showing the cutting of the locking insert to proper size;

Fig. 9 is a side view of a locking screw incorporating the invention contemplated herein during the thread rolling process which is accomplished by means of conventional rolling dies;

Fig. 10 shows still another embodiment of the invention, wherein a locking screw insert is mounted in a slot adjacent the end of the screw shank and also in proper position in the same manner as the embodiments shown above;

Fig. 11 is a cross sectional view of the fastener shown in Fig. 10 taken along the line 11—11;

Fig. 12 is a longitudinal view of the fastener shown in Fig. 10 taken along the line 12—12;

Fig. 13 is a side elevational view, partly in section, showing a locking insert of the type contemplated by the invention herein disposed at an acute angle relative to the axis of the screw member; and Fig. 14 is a view similar to Fig. 5 and shows another embodiment wherein the insert is located to one side of the longitudinal axis of the fastener shank.

Referring now to the drawings, wherein like numerals are used to denote corresponding parts, Fig. 1 shows a locking screw designated generally by the numeral 10 comprised of a head 12, a shank portion 14, which shank portion is provided with an aperture 16 adapted to accommodate a plug of resilient material 18; such resilient material being any of the well known plastic materials, such as nylon, Orlon, et cetera. The material used in the fabrication in the plug 18 preferably has a resilient characteristic, which characteristic is present over long periods of time, and is not materially affected in the temperature ranges for which the locking screw might be subjected, and which has such other features as being inexpensive, easy to work with, et cetera, which are so essential in the mass production of such devices.

A very important aspect of the invention contemplated herein resides in the method contemplated to be used to secure the insert element 18 within the confines of the screw shank 14. It is contemplated that these locking inserts can be adequately mounted by subjecting the screw blank 14 with the insert 18 mounted therein, as shown in Fig. 2, to a thread rolling operation. The thread rolling process not only forms the helical threads 19 on the shank of the screw, but at the same time swages the material 20 of the shank 14 adjacently positioned to the periphery of the plug into impinging relation therewith, and at the same time compresses the plug forming at least partial screw threads 21 in the end faces thereof. Subsequent to the thread rolling operation, and dependent upon the length of the plug 18 mounted in the stud shank, a predetermined amount of material will extend beyond the valleys and crests of the surrounding threads formed on the screw blank. By predetermining the amount of material desirable to extend beyond the crest of the screw threads, the locking effectiveness of these locking faces is determined and controlled. Tests have been made which prove that the locking and unlocking torques of this prevailing type of locking screw can be closely controlled by selection of the material for the insert and the amount used in the fabrication of the insert.

In Figs. 6 to 8, inclusive, I have shown one method, and the apparatus to be used with that method, to make the locking screws contemplated by this invention. In Fig. 6, the screw blank 10 has been fed into a fixture 22 which is provided with aperture 24 designed to accommodate the shank of the fastener 10. Ports or entry holes 26 and 28 are provided and are aligned relative to each other and preferably arranged to enter the cavity 24 at diametrically opposite sides thereof. Note in Fig. 6 that an insert 30 has been provided to form a hole through which drill bit 32 enters the cavity 24. On rotation of the bit, the desired size of hole may be made in the fastener shank and the bit thereafter withdrawn. In Fig. 7, the next step is shown wherein the supply of locking insert material, such as rod 34, is moved inwardly into the prepared hole of the fastener shank until it extends through the screw blank a predetermined distance. Preferably, the rod 34 is advanced until its terminal end 35 extends slightly beyond the wall portion 36 and the aperture 24 and into the drill hole 26, as shown in Fig. 7. It should be noted, in Figs. 6, 7, and 8, that the dimension of the aperture 24 is greater in cross section than the diameter of the fastener shank. This difference in dimension can be of any magnitude and serves to determine the length of locking insert desired in the particular device. This length, as has been previously mentioned, is dependent upon the type of material to be used and the locking torque desired.

In Fig. 8 is shown the last step in the method designed to prepare this fastener for the thread rolling operation. Fastener 10 is removed from the fixture 22 by knockout pin 38, said removal by the pin serving to shear off the locking insert 18 from the rod 34 by reason of the shearing action of the outer surface of the fastener shank 14 and the adjacent wall portion 40 of the fixture 22. At the same time, the terminal end 35 of the rod 34 is sheared from the insert 18 by the lower edge of the wall portion 36 of the aperture 24. Thus, the insert 18 is cut to an exact predetermined length.

The fastener blank, with the insert mounted therein, is now fed through any conventional type of thread rolling machine, which may include thread rolling dies 41 and 42, as shown in Fig. 9. The rolling action deforms the material 20 of the shank 14 surrounding the openings of the aperture 16, so that the material 20 is formed into projecttions which extend into the insert 18 and lock it in place. This rolling action which forms the helical threads 19 on the screw shank 14 at the same time forms the thread segments 21 on the ends of the insert 18. It should be noted that the length of the insert 18 is greater than the diameter of the shank 14, and since the material of the insert is resilient, the thread segments 21 of the insert extend radially outwardly of the threads 19. In other words, the outer diameter A of the threads 19 is less than the outer diameter B of the thread segments 21, as shown in Fig. 3. Furthermore, the bottoms of the thread segments 21 extend radially outwardly from the bottoms of the threads 19 on the screw shank. Thus, the resilient thread segments 21 will effectively engage the threads of a complementary threaded fastening device, not shown, to lock the screw 10 against inadvertent loosening. Upon completion of the thread rolling operation, the device is ready for use. The formation of the thread segments 21 on the ends of the insert 18 makes the application of the fastener 10 to a threaded nut or the like relatively easy since it is only necessary for the threads of the nut to compress the insert and not to cut through it as in a case where the insert is not formed with thread segments. Morover, the forming of thread segments on the insert eliminates the possibility of material being cut from the insert and jamming the threads of the fastener 10 during its application to a complementary fastener element such as a nut.

By reason of the thread rolling operation extruding the metal of the stud inwardly in the vicinity of the marginal edge of the aperture 16 in the fastener, the staking operation which would normally be necessary to secure the locking insert is eliminated.

In Figs. 10, 11 and 12, I show still another form of the invention, wherein a screw 10b is provided with a slot 44 adjacent the end opposite the head of the fastener and a locking insert 18b of suitable size mounted therein. This insert, similar to the insert described in the embodiment shown in Figs. 1 to 5, inclusive, has an overall measurement greater than the length of the slot 44 so that when the thread rolling operation is performed, a predetermined amount of the material of the insert extends beyond the threads of the screw's threads. It should be noted that the shoulders 20b extend inwardly to impinge upon the locking insert where the threads of the screw blend into the threads of the locking insert, and, in addition, that during the thread rolling process, portions 46 of the shank at the extremity thereof and adjacent the locking insert are swaged inwardly to trap the insert 18b and preclude axial movement of the insert relative to the screw shank. In order that deformation of the plastic locking insert 18b is permitted during the thread rolling operation, in some instances, I have found it advisable to provide a space 48 behind the insert so that during the thread rolling operation displacement of the insert is permitted and compression of the insert can be controlled. This space may be provided by forming the slot 44 with a concave wall, as shown in Fig. 12, or alternatively by forming the insert with a concave inner edge.

In Fig. 13, I show a locking screw 10c, wherein the locking insert 18c is disposed at an acute angle relative to the longitudinal axis of the screw which has the obvious advantage of producing locking surfaces 50 and 52 which are axially spaced each from the other along the shank, so that the locking effect may be obtained for a greater distance along the length of the screw shank. Another advantage of the device of Fig. 13 is that the axial spacing of the locking surfaces 50 and 52 tends to tilt or cock the screw with respect to the threads of complementary fasteners, not shown, whereby there is an increased frictional resistance between the threads of the screw and the threads of the complementary fastener. Furthermore, because the surfaces 50 and 52 are disposed at an angle to the axis of the insert 18c, the area of these locking surfaces is increased without weakening the screw by increasing the size of the aperture into which the insert 18c is placed. The portions 20c of the screw shank may be extruded as described above to retain the insert 18c.

I also contemplate that where an increase in the amount of locking surface of the insert is advantageous, the aperture provided in the screw shank for accommodating the insert can be located at one side of the diameter of the screw. This structure is shown in Fig. 14, wherein the insert 18d is located at one side of the longitudinal axis of the fastener shank 14d. By this arrangement, the opposite openings in the external wall in the screw have a larger cross sectional area than the cross sectional area of the hole itself when determined mathematically by the formula $\pi r^2$, and, thus, the area of the ends or locking surfaces of the insert 18d is larger than the diameter of the insert. This has the obvious advantage over enlarging the size of ehe aperture drilled in the screw in that the desired increase of locking surface can be provided without weakening the shank of the screw. Furthermore, by locating both locking surfaces or ends of the insert 18d on one side of the center line of the shank 14d, the insert which will engage one side of a complementary fastener, not shown, will tend to force the shank against the opposite side of the complementary fastener and, thereby, increase the frictional resistance between the threads of the shank and the threads of the fastener. As before, the portions 20d of the shank are extruded during the thread rolling operation to retain the insert.

From the foregoing description, it is seen that the present invention has provided a simple, yet highly efficient, self-locking fastener which may be rapidly and economically manufactured. Moreover, the novel method set forth herein makes it possible to form the thread and secure the insert in one step, which not only has the obvious advantage of eliminating the conventional secondary staking operation, but also eliminates the possibility of damage to the threads which might occur during such a secondary staking operation.

While specific embodiments of the invention are hereinabove described and shown, it is to be understood that I do not intend to be limited to the constructions and methods illustrated and described, but limited only by the following claims.

I claim:

1. A self-locking rotary fastener including an elongated shank having rolled screw threads on a peripheral surface thereof, said shank having a recess therein opening at said peripheral surface so as to intersect thread convolutions on said shank, and an insert of deformable material mounted within said recess and presenting an exposed locking section for lockingly engaging complementary thread convolutions, said locking section comprising pre-formed impressed thread segments, each locking portion of which normally extends radially outwardly with respect to corresponding portions of the adjacent screw thread convolutions and providing helical continuations of said convolutions, and means for securing said insert against dislodgment from said recess comprising material of the shank periphery defining the entire mouth of the recess converging to restrict the size of said opening, said material resulting from thread rolling and impingingly encircling the periphery of said insert.

2. A self-locking rotary fastener as set forth in claim 1, wherein the recess which accommodates the insert completely traverses the screw shank to provide a pair of peripheral locking sections.

3. A self-locking rotary fastener as set forth in claim 1, wherein the recess which accommodates the insert extends transversely of and at an acute angle to the axis of the screw member so as to increase the exposed peripheral area of the insert.

4. A self-locking rotary fastener as set forth in claim 1, wherein the recess which accommodates the insert extends transversely of the screw shank and substantially laterally with respect to the screw axis so as to increase the exposed peripheral area of the insert.

5. *The method of producing a self-locking threaded rotary fastener from an elongated unthreaded shank, which includes forming an opening in the unthreaded shank transverse to the longitudinal axis thereof, placing an insert of deformable material into said opening of greater length than the length of said opening so that one end of the insert extends radially from said shank, and thereafter thread rolling the shank to form threads in the shank and said end of the insert and simultaneously deforming portions of said shank surrounding said opening inwardly against said insert to retain the insert in mounted position in said shank.*

6. *The method of producing a self-locking threaded rotary fastener from an elongated unthreaded shank, which includes forming an aperture completely through the unthreaded shank transverse of the longitudinal axis thereof, placing an insert of deformable material into said aperture with opposite ends of the insert extending oppositely from the aperture, thereafter thread rolling the shank to form helical threads thereon and thread segments in the opposite ends of the insert, and simultaneously deforming portions of said shank surrounding said aperture at opposite sides of said shank inwardly against said insert to retain the insert in assembled relationship within said aperture.*

7. *The method of producing a self-locking threaded rotary fastener from a fastener blank having an elongated unthreaded shank, which shank has a deformable insert disposed in a*

*radially opening recess therein with an end of the insert extending radially from the recess, comprising thread rolling the shank to form helical threads thereon and thread segments on said insert end, and simultaneously deforming portions of said shank surrounding said recess inwardly against said insert to retain the insert in preassembled relationship with said shank.*

References Cited in the file of this patent or the original patent

UNITED STATES PATENTS

| Number | Name | Date |
|---|---|---|
| 1,519,126 | Furlan | Dec. 16, 1924 |
| 2,224,659 | Stoll | Dec. 10, 1940 |
| 2,539,887 | Boots | Jan. 30, 1951 |
| 2,608,229 | Brutus | Aug. 26, 1952 |

FOREIGN PATENTS

| Number | Country | Date |
|---|---|---|
| 372,405 | Great Britain | May 9, 1932 |
| 496,638 | Great Britain | Dec. 2, 1938 |